United States Patent
Griffiths et al.

(10) Patent No.: US 10,536,769 B2
(45) Date of Patent: Jan. 14, 2020

(54) SEALED PIPE-LOADED LOUDSPEAKER FOR IMPROVING LOW FREQUENCY RESPONSE IN PORTABLE DEVICES

(71) Applicant: DOLBY INTERNATIONAL AB, Amsterdam Zuidoost (NL)

(72) Inventors: Kelvin Francis Griffiths, Bridgend (GB); Giuseppe Di Carlantonio, Brussels (BE)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 15/584,744

(22) Filed: May 2, 2017

(65) Prior Publication Data
US 2017/0318383 A1 Nov. 2, 2017

Related U.S. Application Data

(60) Provisional application No. 62/330,378, filed on May 2, 2016.

(51) Int. Cl.
  *H04R 1/22* (2006.01)
  *H04M 1/03* (2006.01)

(52) U.S. Cl.
  CPC .......... *H04R 1/225* (2013.01); *H04M 1/03* (2013.01)

(58) Field of Classification Search
  CPC . H04R 1/225; H04R 1/00; H04R 1/28; H04R 1/2803; H04R 1/2853; H04R 1/2857; H04R 1/2869; H04R 1/2873; H04R 2499/11; H04R 3/002; H04M 1/00; H04M 1/03
  USPC ........................................... 381/349
  See application file for complete search history.

(56) References Cited

U.S. PATENT DOCUMENTS

| | | | |
|---|---|---|---|
| 5,373,564 A | 12/1994 | Spear | |
| 5,824,969 A | 10/1998 | Takenaka | |
| 6,356,643 B2 | 3/2002 | Yamagishi | |
| 8,848,961 B2 | 9/2014 | Huang | |
| 8,971,974 B2 | 3/2015 | Weaver, III | |
| 8,983,101 B2 | 3/2015 | Grinker | |
| 9,883,266 B2 * | 1/2018 | Dai .......................... | H04R 9/06 |
| 2001/0012372 A1 * | 8/2001 | Yamagishi .......... | H04R 1/2857 381/349 |

(Continued)

FOREIGN PATENT DOCUMENTS

| EP | 2040484 | 3/2009 |
|---|---|---|
| EP | 2632171 | 8/2013 |

(Continued)

*Primary Examiner* — Jason R Kurr

(57) ABSTRACT

Embodiments are directed to a sealed pipe-loaded loudspeaker for augmenting low frequency response in a portable electronic device. A loudspeaker transducer is configured to radiate sound directly out of a forward radiation area and incidentally out of a rearward radiation area, and a sealed transmission line forming a closed pipe acoustically coupled to the transducer through which the rearward radiation propagates to produce standing waves corresponding to the dimensions of the closed pipe, wherein resonances apply a loading to a diaphragm element of the transducer to lower its resonance frequency. An acoustical wave front radiates away from the diaphragm element for the direct sound and is emitted outside of the device, and the rearward radiation is not emitted from the device.

8 Claims, 6 Drawing Sheets

(56) References Cited

U.S. PATENT DOCUMENTS

| | | | |
|---|---|---|---|
| 2004/0105559 A1* | 6/2004 | Aylward | H03G 5/165 |
| | | | 381/103 |
| 2005/0031140 A1 | 2/2005 | Browning | |
| 2012/0300967 A1* | 11/2012 | Saiki | H04R 1/288 |
| | | | 381/349 |
| 2013/0301863 A1 | 11/2013 | Weaver, III | |
| 2014/0341394 A1* | 11/2014 | Croft, III | H04R 1/2811 |
| | | | 381/102 |
| 2015/0129351 A1 | 5/2015 | Wheeler | |
| 2017/0070811 A1* | 3/2017 | Mihelich | H04R 1/2857 |
| 2018/0035199 A1* | 2/2018 | Shao | H04R 9/06 |

FOREIGN PATENT DOCUMENTS

| | | |
|---|---|---|
| FR | 2770734 | 5/1999 |
| GB | 2399473 | 9/2004 |
| JP | 63-072297 | 4/1988 |
| JP | 63-120586 | 5/1988 |
| JP | 2015-026888 | 2/2015 |
| KR | 11-67910 | 7/2012 |
| WO | 00/38475 | 6/2000 |

* cited by examiner

SEALED PIPE-LOADED LOUDSPEAKER FOR IMPROVING LOW FREQUENCY RESPONSE IN PORTABLE DEVICES

CROSS-REFERENCE TO RELATED APPLICATIONS

This application claims priority to U.S. Provisional Patent Application 62/330,378, filed on May 2, 2016, which is hereby incorporated by reference in its entirety.

FIELD OF THE INVENTION

One or more implementations relate generally to audio transducers, and more specifically to a sealed, pipe-loaded loudspeaker for use in small portable devices to extend their low frequency audio response.

BACKGROUND

The increased use of small portable computers, tablet devices, and smartphones to play back movies, videos, high quality audio, as well as to support audio-intensive applications (e.g., games, simulators, Audio/Visual content production, and so on) poses significant challenges to small-scale transducer designs. Because of their small size and deployment in portable devices the transducers (drivers) are often small and relatively inexpensive. They are also often located in less than optimal locations of a device, and are not particularly well packaged within the device. With the emphasis on light-weight, large displays, low power, and so on, audio circuitry is often compromised. Technological advances in speakers and audio processing that are made for home audio applications are often not applied to mobile applications because of severe space constraints and cost considerations.

One significant disadvantage associated with small-scale portable transducer is the fact that they typically have very limited bass or low frequency response. This is largely due to the small transducer size, as well as the lack of any meaningful resonance cavity within the body of increasingly thinner and lighter weight devices. The lack of meaningful bass response significantly limits the ability of such devices to faithfully reproduce a wide range of audio content. Thus, there is an ongoing need to improve the lower frequency performance of tablet, mobile phone and laptop loudspeaker systems.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF EMBODIMENTS

Embodiments are directed to a speaker for augmenting the low frequency response of a portable electronic device, and having an audio transducer, a transmission line acoustically coupled to the transducer configured to transmit sound waves generated by the transducer, a lid configured to acoustically seal the audio transducer and the transmission line, and a digital signal processor functionally coupled to the transducer and configured to compensate for localized attenuation due to resonance within the transmission line. The transducer is a miniature speaker on the order of up to 40 mm long on one side. The transmission line comprises a folded length within a cavity, and wherein the transmission line is one of a constant diameter line and a tapered line. The length and the diameter of the transmission line are configured to generate pipe resonances that augment the very low frequencies of the audio signal. The frequency range of the very low frequencies may be on the order of 100 Hz to 500 Hz. The transmission line may comprise a set of partial baffles that create the folded length. The digital signal processor may execute an equalization and compression function to smooth any localized and peaky attenuation within a frequency response of the audio signal.

In an embodiment, the transmission line is disposed within a frame portion of the portable audio device; and it may be disposed within the frame portion in a space that is originally dedicated to the audio transducer. The portable device may be embodied in one of a laptop computer, a notebook computer, a tablet computer, a mobile phone, and a handheld game device.

Embodiments are further directed to a portable electronic device comprising: a body portion at least partially covering a frame defining an outline of the device; an audio playback circuit comprising an amplifier and signal processing component; an audio transducer disposed within a portion of the frame; and a sealed transmission line acoustically coupled to the transducer configured to transmit sound waves generated by the transducer out of an area for forward radiation from a driver, wherein the signal processing component is configured to compensate for localized attenuation due to resonance within the transmission line.

Embodiments are further directed to a device comprising a loudspeaker transducer configured to radiate sound directly out of the device through a forward radiation area and incidentally within the device from a rearward radiation area, and a sealed transmission line forming a closed pipe acoustically coupled to the transducer through which the rearward radiation propagates to produce standing waves corresponding to the dimensions of the closed pipe, wherein resonances apply a loading to a diaphragm element of the transducer to lower its resonance frequency. For this device, an acoustical wave front radiates away from the diaphragm element for the direct sound and is emitted outside of the device, and the rearward radiation is not emitted from the device.

Embodiments are yet further directed to methods of making and using or deploying the sealed pipe-loaded loudspeaker and/or portable device including the sealed pipe-loaded loudspeaker.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for a sealed enclosure for a miniature audio transducer or loudspeaker that extends the low frequency performance for use in portable mobile devices. This is achieved by creating a long labyrinth within the confines of an existing sealed loudspeaker enclosure, which has an acoustic loading effect (added mass) on the driver mobility. This increases the efficiency at lower frequencies. Any side effects, such as dips or peaks in frequency response corresponding to pipe resonance are resolved using corrective digital signal processing. The transducer is designed so that no increase in outer package envelope is required to gain the low frequency improvement.

The loudspeaker system makes use of only the acoustic loading presented by the air in the pipe to the loudspeaker diaphragm. This mainly adds an acoustic mass and coupled to the transducer lowers the effective bass resonance. Any higher-order standing waves in the pipe at higher frequencies may produce acoustic anomalies, and these are tuned out using certain digital signal processing (DSP) techniques. The resulting transducer system and enclosure is referred to herein as a "sealed pipe loaded loudspeaker."

Any of the described embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Portable, hand-held electronic devices, such as mobile phones, tablet computers, game devices, and so on, usually have small transducers inside their cases that project sound out of small holes or ports in their cases. Such transducers are often located in suboptimal locations due to packaging constraints within the device. Components such as displays, I/O circuitry, batteries, SIM cards, expansion slots, and so on usually take precedence within the crowded bodies of these devices. The audio componentry is thus usually limited to small transducers that are placed at the edge or corners of the device.

Figure 1:
FIG. 1 illustrates a mobile phone or tablet computer with a transducer, under some embodiments.

FIG. 1 illustrates a mobile phone or tablet computer with a transducer, under some embodiments. As shown in FIG. 1, device 100 represents a tablet or smartphone device or laptop computer lid that comprises a body, display, one or more I/O buttons, and a transducer 102 for playback of audio content. In an embodiment, the transducer 102 may be oriented to project sound out of the back or side of the phone.

Figure 2:
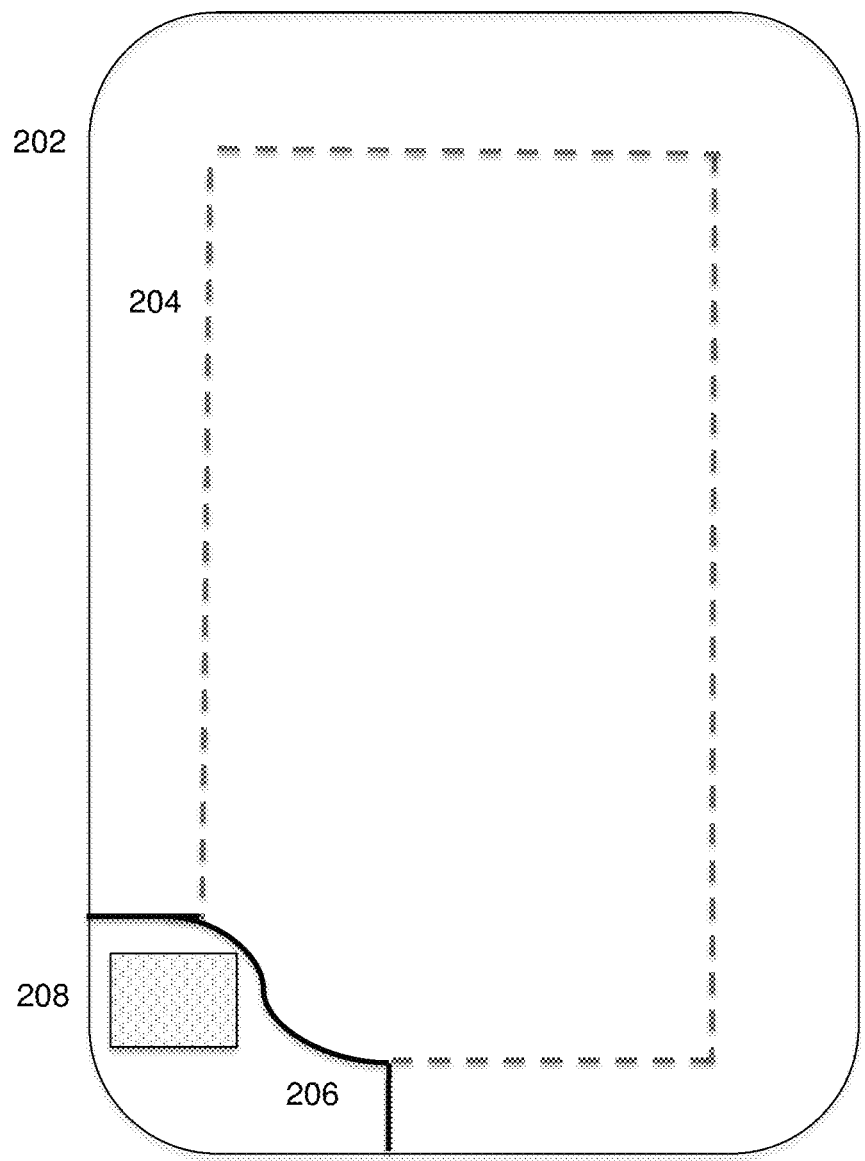
FIG. 2 illustrates an interior or inside portion of the phone or computer of FIG. 1, under some embodiments.

FIG. 2 illustrates an interior or inside portion of the computer or phone device of FIG. 1, under some embodiments. As shown in FIG. 2, the body 202 of the device includes a frame portion 204 that defines the edges of the device. Such as frame may be made of plastic, composite, aluminum, or similar material and serves to hold interior components and as a mounting platform for the display, keypad, and/or body panels of the device, and sizes may range from 3" by 5" to 10"×18" or any other appropriate dimensions. In some embodiments, a portion of the frame 204 is made available for the audio transducer or driver 208. For the embodiment of FIG. 2, a certain open area or cavity 206 within the frame may be available.

The transducer 208 may be any appropriate type of transducer, such as an 8-ohm, 1 Watt internal speaker of a dimension such as 20 mm by 10 mm, or any other similar size and rating, and may be mounted within the frame 204 to fire out the front or back of the device, through a hole or grill. The cavity area 206 may be of a size of approximately 40 mm by 20 mm or any appropriate size as made available within the interior portion of the device.

Figure 3:
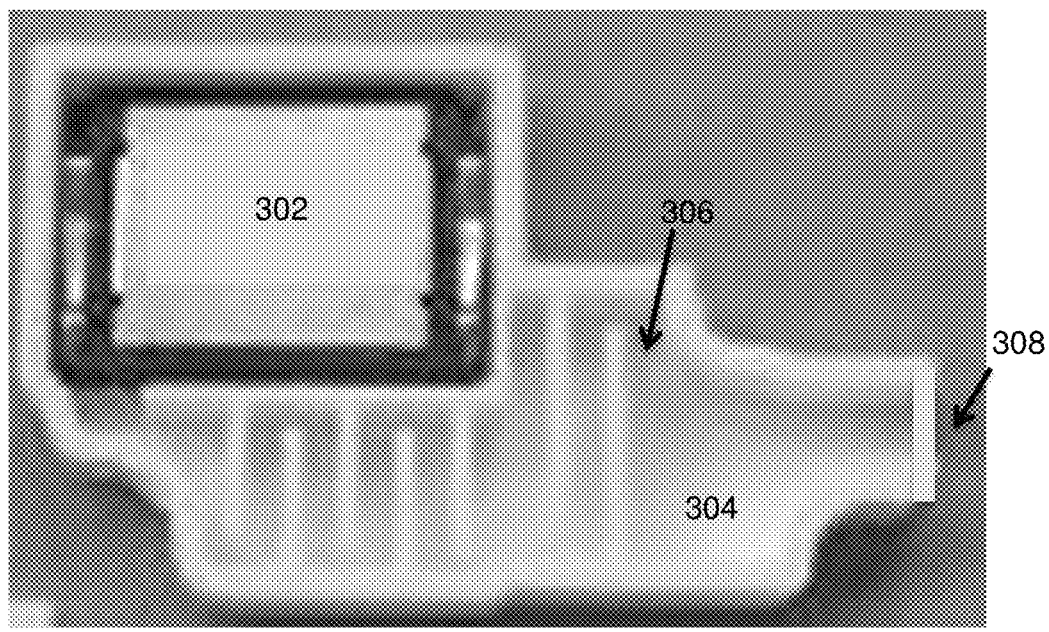
FIG. 3 illustrates a pipe-loaded loudspeaker adapted for use with the device and transducer of FIG. 2, under an embodiment.

In an embodiment, a pipe-loaded enclosure attached to the transducer and is fitted into the device, typically within any available space reserved for the transducer. Together, the transducer and enclosure form a sealed pipe-loaded loudspeaker. FIG. 3 illustrates a pipe-loaded enclosure adapted for use with the mobile phone and transducer of FIG. 2, under an embodiment. As shown in FIG. 3, the transducer 302 is positioned within a portion of the enclosure 304 and is acoustically coupled such that movement of the transducer element in response to the audio signal generates sound waves that travel through the enclosure and out through an opening for forward radiation of sound from the driver. Note that in an embodiment any end portion of the enclosure may be closed off by a plug or wall 308, the entire chamber may then be sealed by a lid. In an embodiment, the enclosure 304 comprises a transmission line that is defined by an array of segments that effectively increases the length of the transmission line. The transmission line essentially comprises a long duct that acts as an acoustic waveguide and is used to transmit the sound from the transducer in an undistorted manner. Such an arrangement may represent a pipe-loaded transmission enclosure or a labyrinth speaker enclosure, and which is referred to as a sealed, pipe-loaded loudspeaker, when sealed with a lid as described below.

Figure 4:
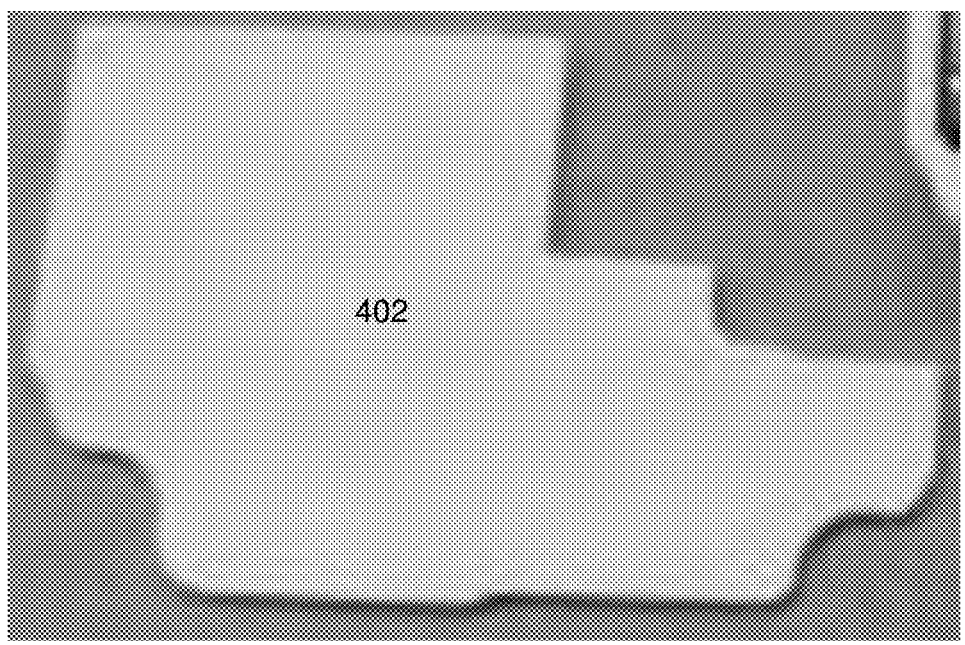
FIG. 4 illustrates a sealed lid for use with the pipe-loaded loudspeaker of FIG. 3, under an embodiment.

In an embodiment, the pipe-loaded enclosure of FIG. 3 is sealed to prevent audio leakage. FIG. 4 illustrates a sealed lid for use with the pipe-loaded enclosure of FIG. 3, under an embodiment. The lid 402 of FIG. 4 is configured to conform to the outline of the enclosure 304 including the transducer 302 portion. It can be glued or welded, or otherwise fixably attached to the enclosure 304 to provide an acoustically sealed chamber, with any end portion (e.g., 308) sealed as well. A gasket or other special sealing interface may be used between the lid and enclosure, if needed.

In general, the forward radiation area refers to the transducer (driver) 208 effective area, i.e., the acoustical wavefront that radiates away from this mechanical surface and assumes whatever area expansion is encountered on its journey through the device 202 to outside the device. Forward radiation is differentiated from rearward radiation, which does not go outside the device, but simply propagates along the sealed pipe 206 and produces standing waves corresponding to the closed pipe dimensions. These resonances apply a loading to the driver diaphragm, lowering its resonance frequency. The transmission line 206 is essentially a closed box, albeit internally partitioned into a long pipe which is closed at the end or ends. As stated above, it is sealed by a lid and at either end, so that it is not ported. Alternatively, it may be opened in an appropriate manner to create a port, and such an embodiment may provide a similar effect, such as at a lower frequency due to modes that would be based on open pipe.

The length and configuration of the transmission line comprising the sealed pipe-loaded loudspeaker are determined based on the configuration of the device, the amount of space available, the transducer size, audio content requirements, and other similar factors.

The transmission pipe is configured to generate pipe resonances that augment the very lowest frequencies of the audio content, such as in the range of 100 Hz to 500 Hz, or any other appropriate low frequency range. The sealed aspect of the pipe-loaded loudspeaker enclosure through the use of the sealed lid 402 creates closed pipe resonances that cause the resonance shift that augments (boosts) the low-frequency response of the speaker.

Figure 5:
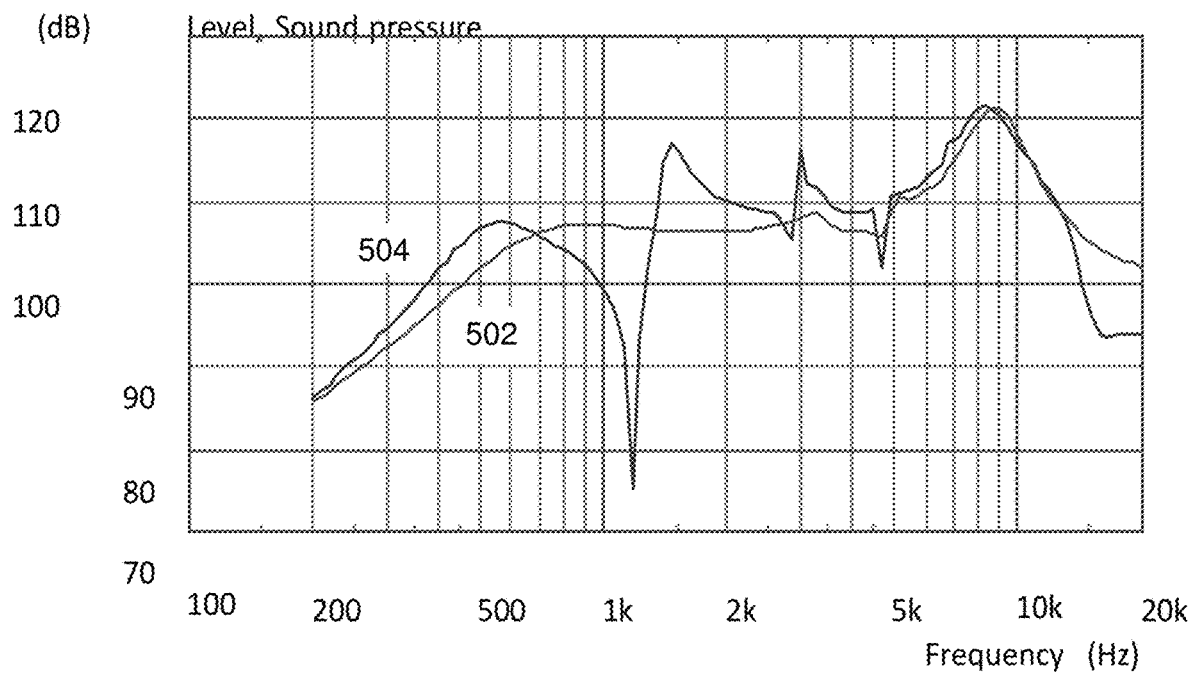
FIG. 5 illustrates example frequency response curves for a sealed pipe-loaded loudspeaker, under some embodiments.

The use of a transmission pipe generally augments low frequency bass components, but may have certain undesirable acoustic effects, such as attenuation or notches at certain harmonic frequencies. FIG. 5 illustrates example frequency response curves for a pipe-loaded enclosure, under some embodiments. The graph of FIG. 5 shows a trace 502 that represents the frequency response of the original subsystem 206 without the pipe-loaded enclosure, and trace 504 illustrates the frequency response of the sealed, pipe-loaded enclosure. As can be seen in FIG. 5, the pipe-loaded enclosure provides an extra 5 dB (approximately) in the low frequency region (i.e., 300-500 Hz). The improvement in response within the low frequency range (200 Hz to 700 Hz) is critical and shows a relatively large amount of extra low frequency energy. In an absolute sense, this may not necessarily be a huge amount of extra bass, but such an improvement is often very difficult to achieve with small-scale transducers. In general it is difficult to obtain from inherent speaker attributes themselves, this type of low frequency response increase.

Figure 6:
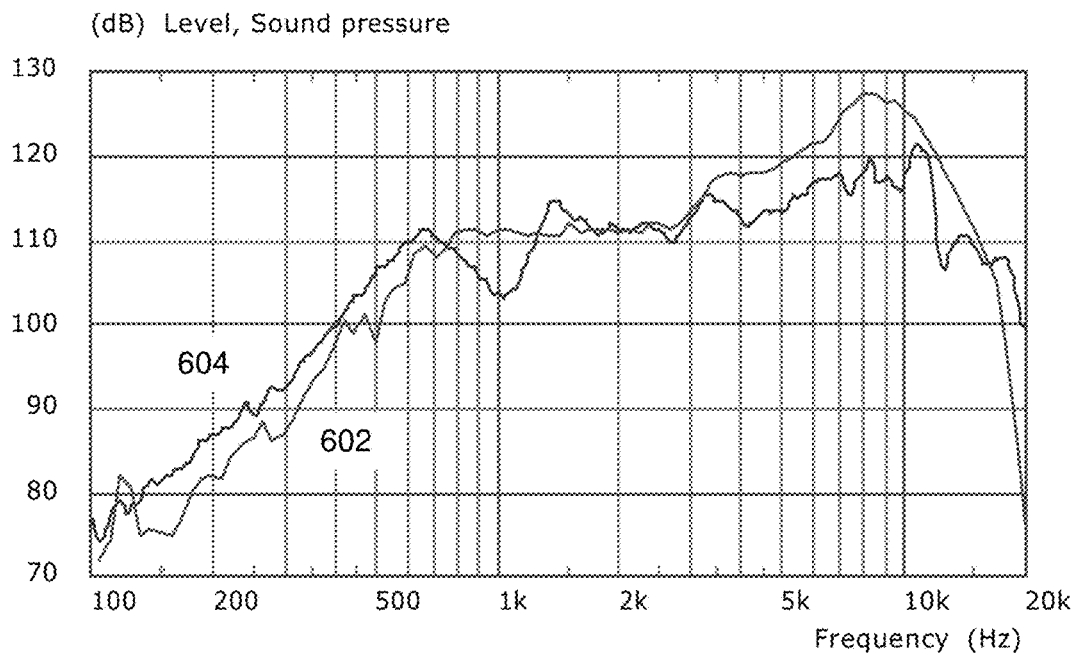
FIG. 6 illustrates frequency response curves for measured acoustic responses corresponding to the simulated response of FIG. 5, under an embodiment.

As shown, the sealed, pipe-loaded enclosure may provide certain benefits to low-frequency response, however, the use of a transmission line may also introduce certain negative aspects. For the example of FIG. 5, there are notches at certain frequencies, such as 1 KHz, 3 KHz, and so on. These dips or notches are generally caused by or associated with the pipe resonance. The graph of FIG. 5 represents a simulated frequency response as may be provided by a computer-executed modeling program, and thus may represent certain effects in an exaggerated manner FIG. 6 illustrates frequency response curves for measured acoustic responses corresponding to the simulated response of FIG. 5, under an embodiment. As can be seen in FIG. 6, the notches at the certain harmonic frequencies are not as pronounced as in the simulated response curve of FIG. 5. This is due to the fact that real-world effects such as air viscosity and other natural effects may mitigate the harmonic effects of the transmission line. The dimensions of the transmission pipe (i.e., length/width) generally dictates where notch frequencies are located, and the severity of the notches is based on damping within the system. Given the air movement in the relatively narrow channel area, small leaks result in attenuation in notchiness in response due to viscous losses in the pipe.

In an embodiment, the negative aspects of using the transmission pipe are overcome using certain acoustic signal processing components. For example, equalization is used to soften the knock at 1 KHz, for the response of FIG. 5. In an embodiment, a simple FIR/IIR (finite impulse response/infinite impulse response) pole inverting type filter for DSP control of the upper resonances can be used. However, it is usually the case that notches in the response are psychoacoustically more benign that peaks and it is possible that few or no further filtering is required for the upper response. If any filtering is required, it can typically be configured to focus on the peaks of the frequency response.

In general, the low-frequency augmentation effect is determined by the length and diameter of the transmission pipe. Embodiments of a sealed pipe-loaded loudspeaker may be advantageously used in a subwoofer application in a laptop computer (or similar portable device) where extra low-frequency (LF) performance is needed for a given package size. In such a case, the effects of any upper pipe resonances are generally outside the system bandwidth and are thus not critical. As the frequency response graphs of FIGS. 5 and 6 indicate, the loading of the driver is such that the output following the bass resonance is "pulled down" by the pipe loading thus augmenting the electronic low pass filtering.

Figure 7:
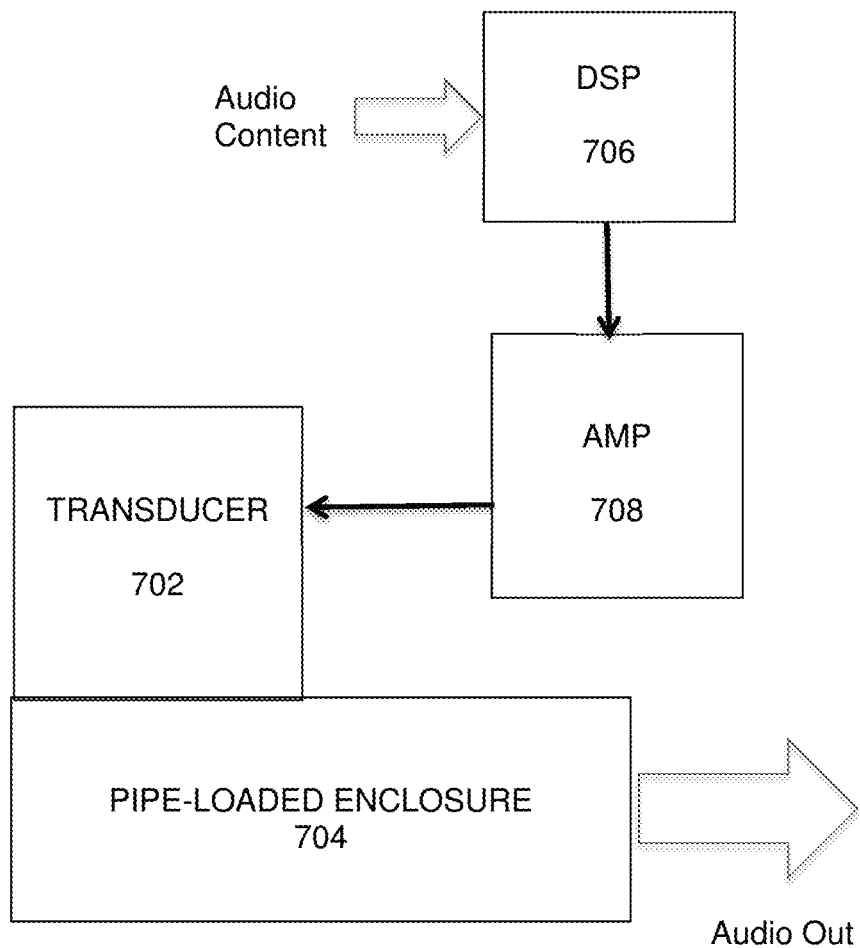
FIG. 7 illustrates a pipe-loaded loudspeaker system, under some embodiments.

FIG. 7 illustrates a pipe-loaded enclosure system, under some embodiments. As shown in FIG. 7, transducer 702 is acoustically coupled to pipe-loaded enclosure 704 to transmit audio out of a sound radiation area. The pipe-loaded enclosure 704 may be straight diameter, tapered, or shaped in accordance with any appropriate configuration. Alternatively, the pipe-loaded enclosure may be embodied in a Voigt pipe or other similar transmission line design. A digital signal processor (DSP) 706 provides appropriate equalization (EQ) or other effects to mitigate the notches at the relevant frequency or frequencies due to pipe resonances. An internal audio amplifier 708 drives the transducer, and the signal processing may be applied to the amplifier for modifying the audio signal applied to the transducer.

Certain techniques can be used to determine the achievable resonance shift produced by the pipe-loaded sealed loudspeaker given the device size and constraints. For example if a specific geometry for a specific or known device or portion of a device is provided, simple modeling (e.g., finite-element modeling, FEM, techniques) can be used to determine the frequency effects. Alternatively, certain mathematical formulae may be used to determine the frequency effects. An example is provided below for the simple case of a driver attached to a sealed pipe of a constant cross-section.

Figure 8:
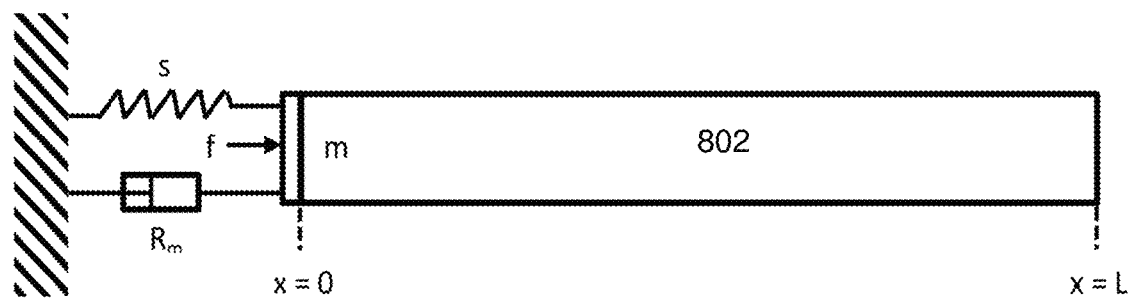
FIG. 8 illustrates an example sealed pipe-loaded loudspeaker for deriving forces acting in the system and the resonance frequencies.

FIG. 8 illustrates an example sealed pipe-loaded loudspeaker for deriving forces acting in the system and the resonance frequencies. Below is the general formulation for the driver-pipe combination that represents the simplest case of a sealed pipe-loaded loudspeaker under an embodiment. These formulae allow a determination of forces acting in the system and the resonance frequencies. For the embodiment of FIG. 8, a straight pipe 802 is acted on by a driver. The input mechanical impedance of the driver is given by the formula:

$$Z_{md} = R_m + j(\omega m - s/\omega)$$

The input mechanical impedance of pipe is given by the formula:

$$Z_{m0} = \frac{Sp(0, t)}{u(0, t)}$$

Combining the driver and pipe gives:

$$f=(Z_{md}+Z_{m0})u(0,t)$$

The resonance frequencies of the combined driver-pipe system are found when:

$$Im\{Z_{md}+Z_{m0}\}=0$$

These equations can be adapted or expanded to accommodate other more complex geometries other than a straight pipe shown in FIG. 8.

Embodiments may be used with any appropriate small-scale or miniature speaker system used in portable electronic devices, such as mobile phones, tablets, notebook/laptop computers, game consoles, and the like.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," and "hereunder" and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A small handheld portable communication apparatus comprising:
    a frame defining the edges of the apparatus and having four sides joined by four rounded corners;
    a cavity formed within a rounded corner portion of the frame and having a shape conforming to the rounded corner and a dimension of not greater than 50 mm on one side;
    a sealed pipe-loaded enclosure configured to fit within the cavity and hold a miniature audio transducer joined to a sealed transmission line in a curved arrangement matching the rounded corner portion of the frame,
    the miniature audio transducer mounted within the enclosure and projecting forward audio radiation out of a first surface, and projecting rearward audio radiation opposite the forward audio radiation, and
    the sealed transmission line forming a totally closed pipe configured to prevent leakage of audio from the apparatus and acoustically coupled to the transducer and through which the rearward audio radiation propagates to produce standing waves corresponding to the dimensions of the closed pipe, wherein closed pipe resonances apply a loading to a diaphragm element of the transducer to lower its resonance frequency through a resonance shift that boosts very low frequencies of audio content; and
    a digital signal processor (DSP) functionally coupled to the transducer and configured to compensate for localized attenuation due to resonance within the transmission line.

2. The apparatus of claim 1 further comprising a lid formed in the shape of the enclosure and at least one end plug configured to completely seal the rearward audio radiation within the housing and to form the sealed transmission line, wherein the resonance shift comprises combined resonance frequencies derived from an input mechanical impedance of the audio transducer and an input mechanical impedance of the closed pipe.

3. The apparatus of claim 2 comprising one of a mobile phone and a tablet computer, and wherein the miniature audio transducer has a size of approximately 10 mm by 20 mm.

4. The apparatus of claim 1 wherein the transmission line comprises a folded length within the enclosure, and wherein the transmission line is one of a constant diameter line and a tapered line.

5. The apparatus of claim 4 wherein the length and the diameter of the transmission line are configured to generate pipe resonances that boost the very low frequencies of the audio signal.

6. The apparatus of claim 5 wherein the frequency range of the very low frequencies comprises 100 Hz to 500 Hz, and wherein the enclosure is of a size of approximately 20 mm by 40 mm.

7. The apparatus of claim 6 wherein the transmission line comprises a set of partial baffles that create the folded length.

8. The apparatus of claim 1 wherein the digital signal processor executes an equalization and compression function to smooth any localized and peaky attenuation within a frequency response of the audio signal, the equalization function comprising a finite impulse response/infinite impulse response (FIR/IIR) pole inverting type filter for DSP control.

* * * * *